Patented June 3, 1947

2,421,369

UNITED STATES PATENT OFFICE 2,421,369

SEED DRESSING AGENTS EMPLOYING A HYDROXY PHENYL DIAZONIUM COMPOUND

Wilhelm Bonrath, Leverkusen I. G.-Werk, and Ewald Urbschat, Cologne-Mulheim, Germany; vested in the Attorney General of the United States No Drawing. Application March 29, 1943, Serial No. 481,010. In Germany October 10, 1940

6 Claims. (Cl. 167—31)

This invention relates to a fungicidal preparation.

As seed dressing agents generally organic mercury compounds are used which are distinguished by an excellent fungicidal efficacy. Nevertheless, these compounds possess certain disadvantages in that they are all rather toxic and sometimes prevent germination of the seed. For these reasons, it has been attempted to replace such mercury compounds at least in part in seed dressing agents. As mercury-free fungicidal preparations hydroxyphenylhydrazines have recently been suggested. These compounds possess a very good fungicidal efficacy especially against winged blight of oats. If, however, they are stored in admixture with mercury or copper compounds, these heavy metal compounds are reduced, whereby the efficacy of the mixture decreases. Since such mixtures are of great practical importance, this reducing property of the hydroxyphenylhydrazines hampers their practical use. Also double salts of aromatic diazonium salts, in which the aromatic nucleus may be substituted, for instance, by alkyl, nitro or halogen atoms, and mercuric chloride have been suggested as seed dressing agents. Their fungicidal efficacy (if any) is due to the presence of mercury. As mercuric chloride, which they contain, is toxic they are not suited for combatting winged blight of oats.

We have now found that aromatic diazo compounds which contain besides the diazo group the second valency of which is bound to a radical other than a hydrocarbon residue, at least one phenolic hydroxyl group in the molecule, are far more useful as fungicides than the hitherto known mercury-free preparations. Their fungicidal efficacy is partly still better than that of the hydroxyphenylhydrazines; they show the further advantage that they may be stored in mixture with metal salts without chemically changing the same.

The said compounds correspond to the general formula

[HO—Ar(NN)]Y

Ar designates therein an arylene radical, NN is the diazo group; Y is an inorganic or organic radical other than a hydrocarbon residue.

The hydroxyl or the diazo group may be bound to a mono- or polycyclic aromatic ring system. For instance, diazo compounds of the character described may be used which are derived from phenols or naphthols. One or several hydroxyl groups may be present. The diazo group and the phenolic hydroxyl group may be substituents to the same or to different rings. Such compounds which contain both groups as substituents of the same ring have proved to be particularly efficacious. We have further found that advantageously the hydroxyl group and the diazo group stand in 1,4-position to each other.

The aromatic ring system (Ar) may still bear other substituents than the phenolic hydroxyl and the diazo group. Such further substituents are, for instance, alkyl- (for instance methyl, ethyl or isopropyl), aryl- (for instance phenyl) or alkoxy- (for instance methoxy or ethoxy) groups. They may be further substituted by β-chloroalkyl, phenylmethyl, chlorophenyl or β-chloroethoxy radicals or by the —CH₂COOC₂H₅ group. Also sulfone, sulfoxide, carboxylic acid, carboxyalkyl (for instance carboxymethyl or carboxyethyl radicals), arsine oxide radicals or halogen atoms, such as bromine or chlorine, may be substituents to the ring.

In the grouping (NN) both nitrogen atoms may be trivalent (—N=N—) or one of them may be pentavalent

Thus, the diazo group may be functionally intact as in the case of diazonium salts, diazotates, diazo double salts or diazo sulfonates, or the diazo function may have disappeared as it is the case with the diazoamino or diazoimino compounds. As diazo components in the compounds to be used according to our invention, there may be cited, for example, the following groups:

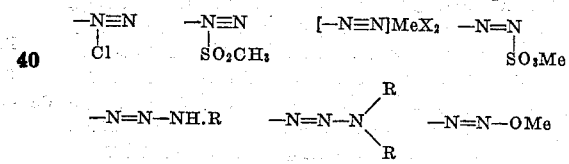

(Me=metal, X=monovalent acid radical, R= eventually substituted hydrocarbon radical.)

It is to be seen therefrom that Y preferably stands either for metal salt which is capable of forming complex salts or an inorganic or organic radical derived from an acid or base.

In the said compounds, the diazo group may be stabilized by chemical means in the known manner or by admixture with inert materials such as sodium sulfate.

The following compounds are by way of example suitable for the purpose of our invention:

(1) Double salt of 4-hydroxyphenyldiazonium-chloride-zinc chloride,
(2) Double salt of 4-hydroxyphenyldiazonium-chloride-mercuric chloride,
(3) Potassium 4-hydroxyphenyldiazosulfonate,
(4) Sodium 3-chloro-4-hydroxyphenyldiazosulfonate,
(5) 4-hydroxyphenyldiazoniummethylsulfinate,
(6) Potassium 3-methyl-4-hydroxyphenyldiazosulfonate,
(7) 4-hydroxyphenyldiazo-acetylsulfanilate,
(8) Sodium 2,3,5 - trichloro-4-hydroxyphenyldiazosulfonate,
(9) Sodium 3,5 - dichloro-hydroxyphenyldiazosulfonate,
(10) 3,5-dichloro-4-hydroxyphenyldiazooxide,
(11) 3,5 - dichloro-4-hydroxyphenyldiazopyrollidide,
(12) 3,5 - dichloro-4-hydroxyphenyldiazopiperidide.

As fungicidal preparations, the said compounds may be used in the usual manner, for instance as dry, wet or oil seed dressing agents. They may also be used in the form of oily emulsions. For the preparation of a dry seed dressing agent, they are admixed with solid inert carriers, for instance chalk, kieselguhr, slate flour or talc. As wet seed dressing agents, they are dissolved in water, for instance in the form of their alkali metal salts. Also oily solutions may be prepared, if necessary by means of a solubilizer.

For fungicidal purposes, the said compounds may be used either alone or together with other fungicides, for instance, organic mercury compounds, such as phenylmercury-acetate, methoxyethyl-mercury-silicate or -chloride or ethyl-mercury-chloride. Such mixtures have proved to be of special importance, since they have an excellent fungicidal efficacy against all plant diseases conveyable by the seed grain, though they may contain less mercury than the known preparations which are now on the market. The aromatic diazo compounds of the character described are in general best suited for combatting the winged blight of oats. They may therefore readily be combined with mercury compounds which as a rule are most efficacious against fusarium of rye, but less active against winged blight of oats.

The mercuric chloride double salts of the hydroxyphenyldiazonium compounds to be used according to our invention are much more active against winged blight of oats than the known seed dressing agents which contain double salts of aromatic diazonium salts and mercuric chloride as active ingredients. If, for instance, seed grain is treated with a preparation containing 9% of mercury as the double salt of phenyldiazoniumchloride and mercuric chloride in the amount of 4:1000, still 12.3% of the seedlings are attacked by winged blight of oats, whereas, if a batch of the same seed grain is treated with the double salt of p-hydroxyphenyldiazonium-chloride and mercuric chloride in the same concentration of mercury in the amount of only 3:1000, 0.9% of the seedlings are attacked. With the untreated seed grain, the attack was 25.9%.

Our invention is furthermore illustrated by the following examples without, however, being limited thereto, the parts being by weight:

EXAMPLE 1

*Preparation 1*

25 parts of potassium 4-hydroxyphenyldiazosulfonate+75 parts of talc,

*Preparation 2*

(a) 30 parts of sodium 1-hydroxy-2-methyl-benzene-4-diazosulfonate+70 parts of talc,
(b) 20 parts of sodium 1-hydroxy-2-methyl-benzene-4-diazosulfonate+80 parts of talc,

*Preparation 3*

10 parts of potassium 4-hydroxyphenyl-diazosulfonate+1% of mercury as phenylmercuryacetate; rest=inert material,

*Preparation 4*

30 parts of sodium 1-hydroxy-3-chlorobenzene-4-diazosulfonate+70 parts of talc,

*Preparation 5*

30 parts of 2,6-dichlorophenol-4-diazooxide+70 parts of inert material,

*Preparation 6*

30 parts of 2,6-dichlorophenol-4-diazopiperidide+70 parts of inert material,

*Preparation 7*

30 parts of 1-hydroxy-benzene-4-diazoferricyanide+70% of talc,

*Preparation 8*

30 parts of 1-hydroxy-2-chloro-benzene-4-diazo-(3'-chloro-4'-hydroxy-5'-nitro-benzene)-sulfonate+70 parts of inert material,

*Preparation 9*

30 parts of 1-hydroxy-benzene-4-diazo-borofluoride+70 parts of inert material.

(a) *Fusarium of the rye*

TEST I

|  | Amount of preparation: amount of seed grain | Ill plants in per cent | Healthy plants in per cent |
| --- | --- | --- | --- |
| Preparation 1 | 2:1000 | 0.6 | 79 |
| Preparation 2a | 2:1000 | 0.6 | 77.3 |
| Untreated seeds |  | 17 | 52.3 |

TEST II

|  | Amount of preparation: amount of seed grain | Ill plants in per cent | Healthy plants in per cent |
| --- | --- | --- | --- |
| Preparation 8 | 2:1000 | 0.3 | 50.3 |
|  | 1.5:1000 | 2.3 | 49 |
| Preparation 9 | 2:1000 | 0 | 47.6 |
|  | 1.5:1000 | 1.3 | 45.3 |
| Untreated seeds |  | 19 | 20.3 |

(b) *Winged blight of oats*

TEST I

|  | Proportion | Ill plants in per cent |
| --- | --- | --- |
| Preparation 1 | 2:1000 | 0 |
| Preparation 2a | 3:1000 | 0 |
| Preparation 3 | 2:1000 | 0 |
| Untreated seeds |  | 58.5 |

TEST II

|  | Proportion | Ill plants in per cent |
|---|---|---|
| Preparation 2b | 2:1000 | 0 |
|  | 1.5:1000 | 0 |
| Preparation 4 | 2:1000 | 0 |
|  | 1.5:1000 | 0.25 |
| Preparation 7 | 2:1000 | 0 |
|  | 1.5:1000 | 0.6 |
| Untreated seeds |  | 3.9 |

(c) Stone blight of barley

|  | Proportion | Germination of the spores |
|---|---|---|
| Preparation 2a | 1:1000 | 0 |
| Preparation 3 | 1:1000 | 0 |
| Preparation 4 | 1:1000 | 0 |
| Preparation 5 | 1:1000 | 0 |
| Preparation 6 | 1:1000 | 0 |
| Untreated seeds |  | ++++ |

(d) Stone blight of wheat

|  | Proportion | Germination of the spores |
|---|---|---|
| Preparation 3 | 2:1000 | 0 |
| Preparation 4 | 2:1000 | 0 |
| Preparation 5 | 2:1000 | 0 |
| Preparation 6 | 2:1000 | 0 |
| Untreated seeds |  | ++++ |

EXAMPLE 2

In an experiment on the field, the following results were obtained when combatting the strip disease of barley and while using the dry seed dressing agents cited below:

|  | Preparation | Proportion | Attacked |
|---|---|---|---|
|  |  |  | Per cent |
| 1 | Untreated seeds |  | 16.75 |
| 2 | 20% of potassium 1-hydroxy-2-methyl-benzene-4-diazosulfonate, 80% of talc | 2:1000 | 0 |
| 3 | 30% of sodium 1-hydroxy-2-chloro-benzene-4-diazosulfonate, 70% of talc | 2:1000 | 0.25 |
| 4 | 30% of sodium 1-hydroxy-3-chloro-benzene-4-diazosulfonate, 70% of talc | 2:1000 | 0 |
| 5 | 30% of 1-hydroxy-benzene-4-diazo-piperidide, 70% of talc | 2:1000 | 0.25 |
| 6 | 1% of mercury as methoxyethyl-mercurysilicate, 10% of sodium 1-hydroxy-2-chloro-benzene-4-diazo-sulfonate, Rest (calculated on 100%)=talc | 2:1000 1.5:1000 | 0 0 |

EXAMPLE 3

Seed grains of rye, attacked by fusarium, are dipped for 60 minutes into 0.1 or 0.2% solutions of the following compounds. The results of 3 different series of experiments are resumed in the following table:

First series of experiments

|  | 0.1% solutions | Healthy plants in per cent | Ill plants in per cent |
|---|---|---|---|
| 1 | H₂O | 27.3 | 17.3 |
| 2 | Sodium 1-hydroxy-2-chloro-benzene-4-diazosulfonate | 66 | 0 |
| 3 | Potassium 1-hydroxy-2-methyl-benzene-4-diazosulfonate | 58 | 0 |
| 4 | Sodium 1-hydroxy-3-chloro-benzene-4-diazosulfonate | 63.6 | 0 |
| 5 | 1-hydroxy-phenyl-4-diazo-(3',4'-dichloro-benzene-1'-sulfonate) | 57 | 0 |
| 6 | 1-hydroxy-phenyl-4-diazo-(4'-chloroben-zene-1'-sulfonate) | 59.6 | 0 |
| 7 | 1-hydroxy-phenyl-4-diazo-(4'-acetyl-amino-benzene-1'-sulfonate) | 66.3 | 0 |

Second series of experiments

|  | 0.1% solutions | Healthy plants in per cent | Ill plants in per cent |
|---|---|---|---|
| 1 | H₂O |  | 35 | 16 |
| 2 | 1-hydroxy-phenyl-4-diazo-(2'-chloro-5'-nitro-benzene-1'-sulfonate) | 61.3 | 0 |
| 3 | 1-hydroxy-phenyl-4-diazo-(4'-chloro-5'-nitro-benzene-1'-sulfonate) | 64.6 | 0 |
| 4 | 1-hydroxy-phenyl-4-diazo-(2'-chloro-3',5'-dinitro-benzene-1'-sulfonate) | 59.3 | 0 |
| 5 | 1-hydroxy-phenyl-4-diazo-(4'-chloro-3',5'-dinitro-benzene-1'-sulfonate) | 58.6 | 0 |
| 6 | 1-hydroxy-phenyl-4-diazo-(2',4',6'-trichloro-3'-nitro-benzene-1'-sulfonate) | 62 | 0.3 |

The preparations are also efficacious, when used in feebler concentrations.

Third series of experiments

|  | 0.2% solution | Healthy plants in per cent | Ill plants in per cent |
|---|---|---|---|
| 1 | H₂O | 52.3 | 17 |
| 2 | Potassium 1-hydroxy-benzene-4-diazosulfonate | 72.3 | 1.3 |

EXAMPLE 4

Seed grains attacked by the winged blight of oats are dipped for 30 minutes into 0.05% solutions of the compounds mentioned below. The results are resumed in the following table:

|  | Compound | Attack in per cent |
|---|---|---|
| 1 | H₂O | 4.3 |
| 2 | Calcium 1-hydroxybenzene-4-diazo-sulfonate | 0.24 |
| 3 | Sodium 1-hydroxy-2-chloro-benzene-4-diazosulfonate | 0.38 |
| 4 | 1-hydroxy-benzene-4-diazo-(3',4'-dichlorobenzene)-sulfonate | 0.31 |
| 5 | 1-hydroxy-benzene-4-diazo-(4'-chlorobenzene)-sulfonate | 0 |
| 6 | 1-hydroxy-2-chloro-benzene-4-diazo-(4'-chlorobenzene)-sulfonate | 0 |

EXAMPLE 5

A preparation containing 1% of mercury as methoxyethylmercurysilicate and 12% of potassium 1-hydroxy-2-chloro-phenyl-4-diazosulfonate was tested as seed grain disinfectant in experiments on the field. The following results were obtained:

(1) Stone blight of wheat

|  | Proportion | Ill plants | Healthy plants |
|---|---|---|---|
|  | 2:1000 | 0.3 | 674 |
| Untreated |  | 216.7 | 469 |

(2) Strip disease of barley

|  | Proportion | Attack in per cent |
|---|---|---|
|  | 1.5:1000 | 0 |
|  | 2:1000 | 0 |
| Untreated |  | 31.2 |

(3) Fusarium of rye

|  | Proportion | Ill plants | Healthy plants |
|---|---|---|---|
|  | 1.5:1000 | 0 | 61.5 |
|  | 2:1000 | 0 | 63.5 |
| Untreated |  | 13 | 23.5 |

(4) *Winged blight of oats*

|  | Proportion | Attack in per cent |
|---|---|---|
|  | 1.5:1000 | 0 |
|  | 2:1000 | 0 |
| Untreated | | 4.4 |

The said preparation is as efficacious as the commercial preparation containing 1.5% of mercury as methoxy-ethyl-mercury-silicate. A saving of 33.3% of mercury has thus been obtained. It has also been examined whether the above preparation impairs the germination of the seed. The respective tests have shown that seed grain is in no way damaged by the treatment.

While we have described our improvements in great detail and with respect to preferred embodiments thereof, we do not desire to limit ourselves to such details or embodiments, since many modifications and changes may be made and the invention embodied in widely different forms without departing from the spirit or scope of the invention in its broadest aspects.

We claim:

1. Seed fungicidal preparations comprising a substantial quantity of an inert solid material and a lesser quantity of the double salt of a metal salt and a hydroxy phenyl diazonium compound.

2. The process of combatting fungus diseases on seeds and the like which comprises treating seeds with a composition containing an inert solid substance and an active ingredient which is an aromatic diazo compound selected from the class consisting of aromatic diazonium salts, aromatic diazotates, aromatic diazo metal salts, aromatic diazo sulfonates, aromatic diazo oxides, aromatic diazo amines, and aromatic diazo imines, the aromatic ring having a phenolic hydroxyl group.

3. The process as defined in claim 2 wherein the aromatic diazo compound is the double salt of a metal salt with an aromatic diazonium compound.

4. A seed fungicidal composition comprising a substantial quantity of a solid inert material and as its active ingredient a lesser quantity of a compound having the formula [HO—Ar(NN)]Y, wherein Ar designates an arylene radical, NN is the diazo group, and Y is an N-heteroarylene organic radical.

5. The composition of claim 4 in which the hydroxy-phenyl-diazo compound is 3.5-dichloro-4-hydroxy-phenyl-diazo-pyrollidide.

6. The composition of claim 4 in which the hydroxy-phenyl-diazo compound is 3.5-dichloro-4-hydroxy-phenyl-diazo piperidide.

WILHELM BONRATH.
EWALD URBSCHAT.

REFERENCES CITED

The following references are of record in the file of this patent:

UNITED STATES PATENTS

| Number | Name | Date |
|---|---|---|
| 1,919,729 | Kharasch | July 25, 1933 |
| 1,982,681 | Markush | Dec. 4, 1934 |
| 2,191,259 | Pfaff et al. | Feb. 20, 1940 |
| 2,336,308 | Smith | Dec. 7, 1943 |

FOREIGN PATENTS

| Number | Country | Date |
|---|---|---|
| 290,288 | Great Britain | 1929 |

OTHER REFERENCES

Beilstein, "Organische Chemie," Band XVI, 1933, pages 525, 526, and 529. (Copy in Patent Office Library.)